(12) United States Patent
Zhou et al.

(10) Patent No.: US 10,490,779 B2
(45) Date of Patent: Nov. 26, 2019

(54) SCREEN ASSEMBLY, MOBILE TERMINAL AND METHOD FOR MANUFACTURING THE SCREEN ASSEMBLY (71) Applicant: GUANGDONG OPPO MOBILE TELECOMMUNICATIONS CORP., LTD., Dongguan, Guangdong (CN)

(72) Inventors: Yibao Zhou, Guangdong (CN); Xiaowei Wang, Guangdong (CN); Yongjun Qian, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/137,766

(22) Filed: Sep. 21, 2018

(65) Prior Publication Data

US 2019/0165324 A1    May 30, 2019

(30) Foreign Application Priority Data

Nov. 28, 2017 (CN) .......................... 2017 1 1215360

(51) Int. Cl.
*H04M 1/00* (2006.01)
*H01L 51/52* (2006.01)
(Continued)

(52) U.S. Cl.
CPC ........ *H01L 51/5284* (2013.01); *G02F 1/1339* (2013.01); *G02F 1/133512* (2013.01);
(Continued)

(58) Field of Classification Search
CPC ................ H01L 51/5284; H01L 51/56; H02F 1/133512; G02F 1/1339; H04M 1/0266;
(Continued)

(56) References Cited

U.S. PATENT DOCUMENTS 9,602,638 B2     3/2017  Kim et al.
2001/0055384 A1* 12/2001  Yamazaki ............. G06F 3/0202
                                                       379/419
(Continued)

FOREIGN PATENT DOCUMENTS

CN          103200798 A      7/2013
CN          203217510 U      9/2013
(Continued)

OTHER PUBLICATIONS

International search report,PCT/CN2018/104387, dated Dec. 5, 2018 (10 pages).

(Continued)

*Primary Examiner* — Danh C Le (57) ABSTRACT

The present disclosure provides a screen assembly, a method for manufacturing the same and a mobile terminal. The screen assembly includes: a screen including a display portion and a non-display portion surrounding the display portion; a cover plate stacked on the screen and including a transparent portion corresponding to a location of the display portion and a bezel portion surrounding the transparent portion, wherein a vertical projection of the bezel portion on the screen covers the whole non-display portion; a masking layer attached on a side of the bezel portion close to the screen and covering the whole bezel portion; and a light-shielding layer attached on a side of the masking layer close to the screen and stacked on the non-display portion; wherein, a vertical projection of the masking layer on the screen covers a vertical projection of the whole light-shielding layer on the screen.

18 Claims, 6 Drawing Sheets

(51) Int. Cl.
  *G02F 1/1335* (2006.01)
  *G06F 1/16* (2006.01)
  *G02F 1/1339* (2006.01)
  *H01L 51/56* (2006.01)
  *H04M 1/02* (2006.01)
  *G02F 1/1333* (2006.01)
  *H04M 1/725* (2006.01)
  *H04W 88/02* (2009.01)

(52) U.S. Cl.
  CPC .............. *G06F 1/16* (2013.01); *G06F 1/1637* (2013.01); *H01L 51/56* (2013.01); *H04M 1/0266* (2013.01); *G02F 2001/133331* (2013.01); *H04M 1/72519* (2013.01); *H04M 1/72522* (2013.01); *H04W 88/02* (2013.01)

(58) Field of Classification Search
  CPC ......... H04M 1/72519; H04M 1/72522; H04W 88/02
  USPC .................................. 455/566, 575.1, 550.1
  See application file for complete search history.

(56) References Cited

U.S. PATENT DOCUMENTS

| | | | | |
|---|---|---|---|---|
| 2008/0170028 A1* | 7/2008 | Yoshida | ............... | G09G 3/20 345/100 |
| 2008/0284719 A1* | 11/2008 | Yoshida | ............ | G02F 1/136277 345/102 |
| 2008/0284768 A1* | 11/2008 | Yoshida | ............... | G09G 3/2022 345/208 |
| 2009/0323154 A1* | 12/2009 | Sampsell | ............. | G02B 26/001 359/247 |
| 2010/0091439 A1* | 4/2010 | Horii | .................. | H04M 1/0249 361/679.01 |
| 2012/0274570 A1* | 11/2012 | Kim | .................... | H04M 1/0237 345/168 |
| 2013/0082961 A1 | 4/2013 | Wang et al. | | |
| 2015/0021571 A1* | 1/2015 | Yamakita | ............ | H01L 51/5228 257/40 |
| 2015/0036845 A1 | 2/2015 | Lu et al. | | |
| 2016/0026222 A1 | 1/2016 | Deng et al. | | |
| 2016/0062391 A1* | 3/2016 | Choi | .................... | G06F 1/1601 361/679.03 |
| 2016/0146991 A1* | 5/2016 | Li | ..................... | G02F 1/133512 359/885 |
| 2017/0177032 A1 | 6/2017 | Cheng | | |
| 2018/0269397 A1* | 9/2018 | Xin | .................... | H01L 51/0011 |

FOREIGN PATENT DOCUMENTS

| | | |
|---|---|---|
| CN | 103442532 A | 12/2013 |
| CN | 103576949 A | 2/2014 |
| CN | 103778855 A | 5/2014 |
| CN | 103885626 A | 6/2014 |
| CN | 103991299 A | 8/2014 |
| CN | 104699287 A | 6/2015 |
| CN | 204758969 U | 11/2015 |
| CN | 107748461 A | 3/2018 |

OTHER PUBLICATIONS

Extended European Search Report, Appln. No. 18194049.5; dated Feb. 25, 2019 (11 pages).
Anonymous:"Screen Printing—PrintWiki",Aug. 16, 2009,XP055556500,Retrieved from the Internet:URL:https://web.archive.org/web/20090816032535/printwiki.org/Screen_Printing(3 pages).
First Office Action from China patent office in a counterpart Chinese patent Application 201711215360.3, dated Jul. 22, 2019 (8 pages).

* cited by examiner

SCREEN ASSEMBLY, MOBILE TERMINAL AND METHOD FOR MANUFACTURING THE SCREEN ASSEMBLY

CROSS-REFERENCE TO RELATED APPLICATIONS

The present application claims foreign priority of Chinese Patent Applications No. 201711215360.3, field on Nov. 28, 2017 in the State Intellectual Property Office of China, the entire contents of which are hereby incorporated by reference.

TECHNICAL FIELD

The present disclosure relates to the mobile terminal technical field, and in particular to a screen assembly, a mobile terminal with the screen assembly and a method for manufacturing the screen assembly.

BACKGROUND

In a fringe area of a screen assembly, driving circuits for providing voltage to pixel units may be installed. The portion occupied by the driving circuits is a non-display portion which does not emit light (also called black edge). When the screen assembly is assembled on a mobile terminal such as mobile phone, light may leak from the non-display portion.

DETAILED DESCRIPTION

In order to facilitate the understanding of the present invention, the present disclosure will be described in detail hereinafter with reference to the accompanying drawings. Embodiments of the disclosure are given in the drawings. However, the present disclosure may be embodied in many different forms and is not limited to the embodiments described herein. Rather, these embodiments are provided so that the present disclosure will be better understood.

It should be noted that when an element is referred to as being "fixed" to another element, it may be directly fixed on the other element or an element may be present between these two elements. When an element is considered to be "connected" to another element, it can be directly connected to the other element, or similarly, an element may be present between these two elements. The terms "inner", "outer", "left", "right" and the like, as used herein, are merely for the purpose of illustration but not intended to be the only implementation form of the present disclosure.

Figure 1:
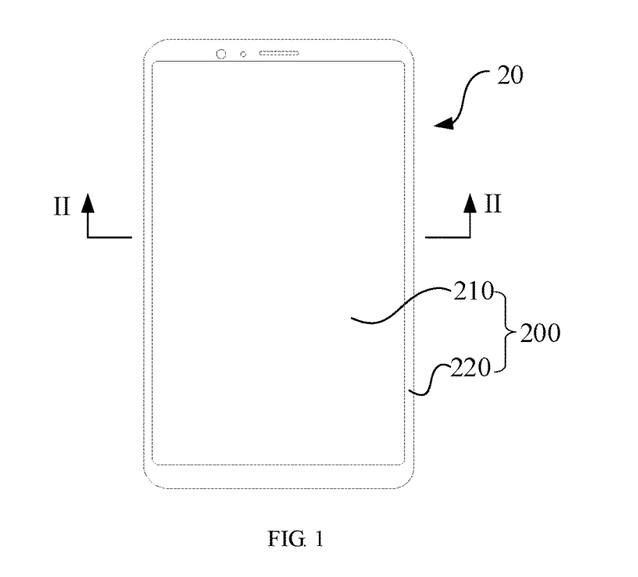
FIG. 1 is a schematic structural view of a mobile terminal according to an embodiment of the present disclosure.
Figure 2:
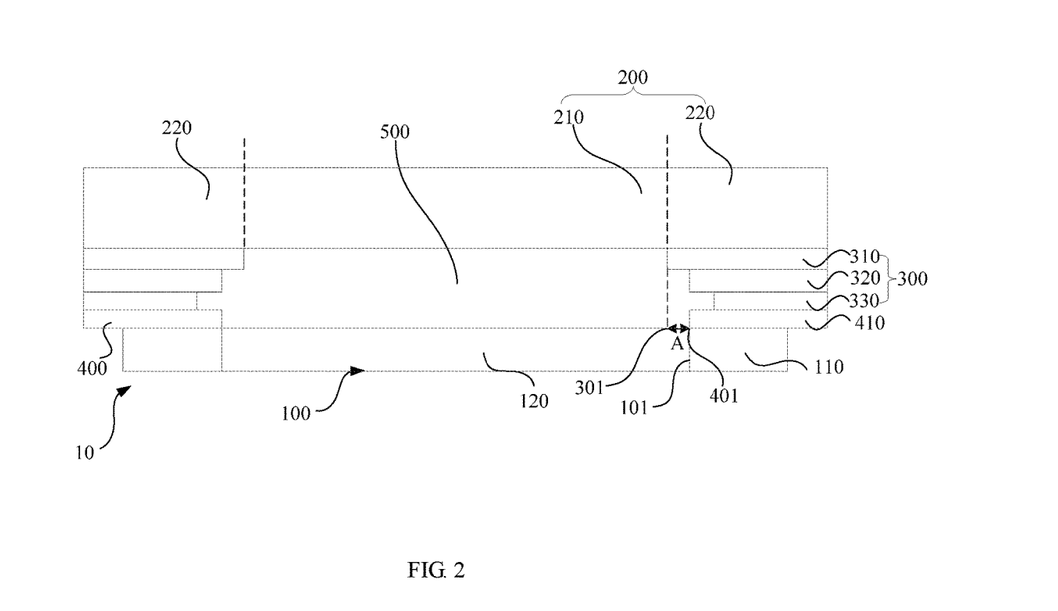
FIG. 2 is a section view of the screen assembly in the mobile terminal of FIG. 1 taken along the line II-II.

Referring to FIG. 1 and FIG. 2, a screen assembly 10 is provided. The screen assembly 10 may include a screen 100, a cover plate 200, a masking layer 300 and a light-shielding layer 400. The screen 100 may include a display portion 120 and a non-display portion 110. The display portion 120 may emit light. The non-display portion 110 may be installed with driving circuits (which are utilized to drive the pixels of the display portion 120), and may not emit light. The non-display portion 110 may also be referred to as the black edge. The screen 100 may be a liquid crystal display (LCD) screen, organic light-emitting diode (OLED) screen and the like.

Figure 3:
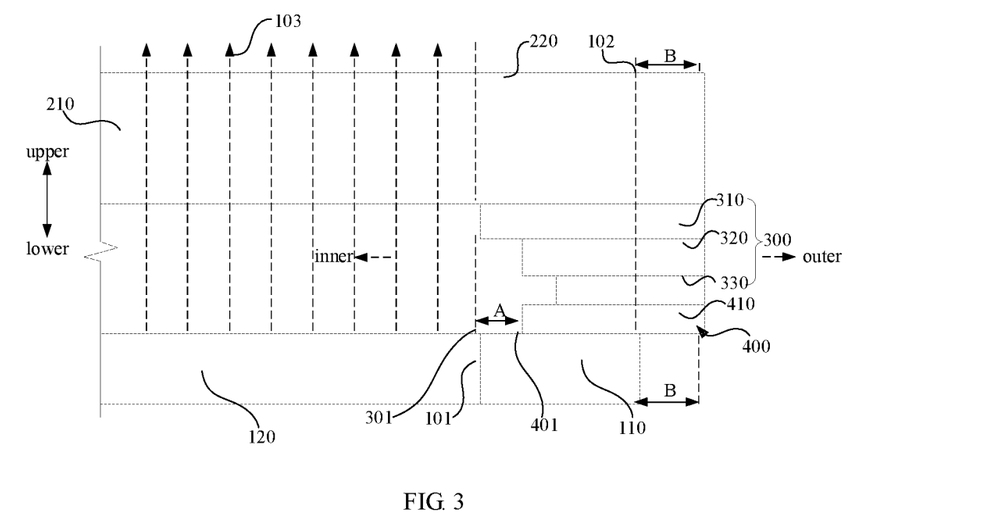
FIG. 3 is a schematic structural view of a screen assembly according to an embodiment of the present disclosure.

Referring to FIG. 1 and FIG. 3, the cover plate 200 may be a glass cover plate. The cover plate 200 may be stacked on the screen 100. For example, the cover plate 200 may be attached onto the screen 100 by an optically clear adhesive (OCA) layer 500. The cover plate 200 may include a transparent portion 210 and a bezel portion 220. The bezel portion 220 may connect to and surround the edge of the transparent portion 210. For example, the transparent portion 210 may have a substantially rectangular configuration, and the bezel portion 220 may have a substantially annular configuration. The transparent portion 210 may allow lights to pass. Light emitted by the screen 100 may penetrate though the transparent portion 210 such that images displayed by the screen 10 may be seen at the side of the transparent portion. However, light emitted by the screen 100 cannot come out from the bezel portion 220 which is under the cooperative coverage of the masking layer 300 and the light-shielding layer 400. Thus, the user cannot see the image displayed by the screen 100 from the bezel portion 220. The vertical projection of the bezel portion 220 on the screen 100 may cover the whole non-display portion 110.

The masking layer 300 may be substantially annular. The masking layer 300 may be colored. The inner edge of the masking layer 300 may be aligned with the edge of the transparent portion 210. The masking layer 300 may be attached to a surface of the bezel portion 220 close to the screen 100 (i.e., the lower surface or inside surface of the bezel portion 220). The masking layer 300 may cover the whole bezel portion 220, that is to say, the masking layer 300 may be attached to and cover the whole lower surface (inside surface) of the bezel portion 220. Given that the vertical projection of the bezel portion 220 on the screen 100 covers the whole non-display portion 110, the vertical projection of the bezel portion 220 on the screen 100 may also cover the whole non-display portion 110 (i.e., the black edge). When the screen is powered on and a user observe the screen 100 from the upper side (outside) of the cover plate 200, the user will not perceive the non-display portion 110 (i.e., the black edge) of the screen 100 because of the coverage of the masking layer 300. In this circumstance, light leaking at the non-display portion may be prevented such that user experience may be improved.

The light-shielding layer 400 may be substantially annular. The light-shielding layer 400 may be attached on a surface of the masking layer 300 close to the screen 100, i.e., the lower surface of the masking layer 300. Moreover, the light-shielding layer 400 is also stacked on the supper surface of the non-display portion 110. That is to say, the light-shielding layer 400 may be located between the masking layer 300 and the non-display portion 110. The vertical projection of the masking layer 300 on the screen 100 may cover the vertical projection of the whole light-shielding layer 400 on the screen 100. Thus, light 103 emitted by the screen 100 cannot pass through the masking layer 300 nor leak out from the bezel portion 220 because of the light absorption and reflection of the light-shielding layer 400, which may efficiently prevent the light from leaking out and better cover the black edge.

The vertical projection of the masking layer 300 on the screen 100 may be annular. This vertical projection of the masking layer 300 may have a first projection end 301. The first projection end 301 may actually be the vertical projection of the inner edge of the masking layer 300 on the screen 100. The first projection end 301 may be close to the display portion 120. Similarly, the vertical projection of the light-shielding layer 400 on the screen 100 may be annular. This projection of the light-shielding layer 400 may have a second projection end 401. The second projection end 401 may actually be the vertical projection of the inner edge of the light-shielding layer 400 on the screen 100. The second projection end 401 may be close to the display portion 120. The distance between the first projection end 301 and the second projection end 401 may be equal to A, where $0.1 \text{ mm} \le A \le 0.15 \text{ mm}$. For example, A may be 0.1 mm, 0.12 mm, 0.15 mm and the like. To make the vertical projection of the masking layer 300 on the screen 100 to cover the vertical projection of the whole light-shielding layer 400 on the screen 100, the inner edge of the masking layer 300 may be closer to the center of the display portion 120 than the inner edge of the light-shielding layer 400. In this situation, even if there are some machining errors during processing, the inner edge of the light-shielding layer 400 will not be closer to the center of the display portion 120 than the inner edge of the masking layer 300. Thus, the vertical projection of the masking layer 300 on the screen 100 may surely cover the vertical projection of the whole light-shielding layer 400 on the screen 100, thereby preventing light leaking at the non-display portion.

Referring to FIG. 3, in some embodiments, the first projection end 301 is located at the connection position 101 between the display portion 120 and the non-display portion 110, where the connection position 101 is the position of the inner edge of the non-display portion 110 and the edge of the display portion 120. That is, the first projection end 301 may be substantially flush with the inner edge of the non-display portion 110. The vertical projection of the masking layer 300 on the screen 100 may only cover the non-display portion 110. Moreover, the vertical projection of the light-shielding layer 400 on the screen 100 does not cover the connection position 101 between the display portion 120 and the non-display portion 110. That is, the light-shielding layer 400 may cover a part but not all of the non-display portion 110. The second projection end 401 may be located within the area corresponding to the non-display portion 110. There may exist a distance between the second projection end 401 and the inner edge of the non-display portion.

Referring to FIG. 2, in some embodiments, the second projection end 401 may be located at the connection position 101 between the display portion 120 and the non-display portion 110. That is, the second projection end 401 may be substantially flush with the inner edge of the non-display portion 110. The vertical projection of the light-shielding layer 400 on the screen 100 may just cover the non-display portion 110. The vertical projection of the masking layer 300 one the screen may cover the connection position 101 between the display portion 120 and the non-display portion 110. That is, the vertical projection of the masking layer 300 on the screen 100 may cover the whole non-display portion 110 and part of the display portion 120. The first projection end 301 may be located within an area corresponding to the display portion, and there may exist a distance between the first projection end 301 and the inner edge of the non-display portion 110. In this circumstance, during the process where the cover plate 200 and the screen 100 are attached together, even if these two components are not precisely aligned due to attaching errors (i.e., the vertical projection of the axis of symmetry of the cover plate 200 on the screen does not overlap the axis of symmetry of the screen), the vertical projection of the masking layer 300 on the screen 100 may still cover the whole non-display portion 110, that is, the non-display portion 110 may still be sheltered by the masking layer 300 such that light leaking at the non-display portion may be prevented.

Figure 4:
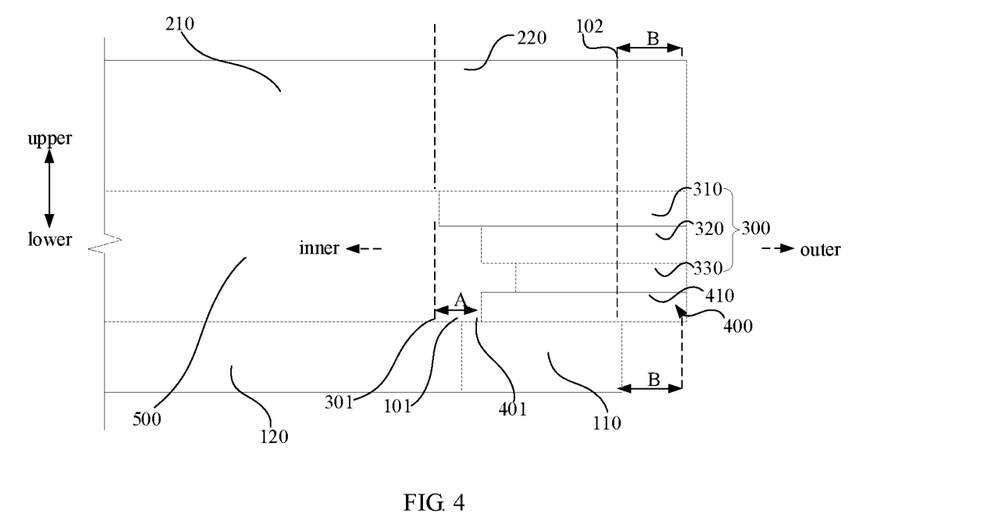
FIG. 4 is a schematic structural view of a screen assembly according to another embodiment of the present disclosure.

Referring to FIG. 4, in some embodiments, the connection position 101 between the display portion 120 and the non-display portion 110 may be located between the first projection end 301 and the second projection end 401. In this situation, the vertical projection of the masking layer 300 on the screen 100 may cover the connection position 101 between the display portion 120 and the non-display portion 110. That is, the vertical projection of the masking layer 300 on the screen 100 may cover the whole non-display portion 110 and part of the display portion 120. The first projection end 301 may be located within an area corresponding to the display portion 120. There may exist a distance between the first projection end 301 and the inner edge of the non-display portion 110. Furthermore, the light-shielding layer 400 may cover only part of the non-display portion 110. The second projection end 401 may be within the area corresponding to the non-display portion 110. There may exist a distance between the second projection end 401 and the inner edge of the non-display portion 110. Similarly, even if there exists some attaching errors during the attachment of the cover plate 200 and the screen 100, the non-display portion 100 may still be sheltered by the masking layer 300 such that light leaking at the non-display portion may be prevented.

In some embodiments, the masking layer 300 may be a white masking layer 300, a blue masking layer 300 or a grey masking layer 300. That is, the color of the masking layer 300 may be white, blue, grey or any other color based on actual requirement. The masking layer 300 may present a certain color. Also, the masking layer 300 may present a certain pattern based on actual requirement. Referring to FIGS. 9-12, the masking layer 300 may present a radial-circle pattern 301, a stripe pattern 302, a ripple pattern 303 or a grid pattern 304. Thus, the appearance of the cover plate 200 may be improved.

The light transmittance of the masking layer 300 may be less than 1%. Light emitted by the screen 100 cannot penetrate through the masking layer 300. Thus, the masking layer may effectively shelter the non-display portion 110 and prevent light leaking.

Figure 5:
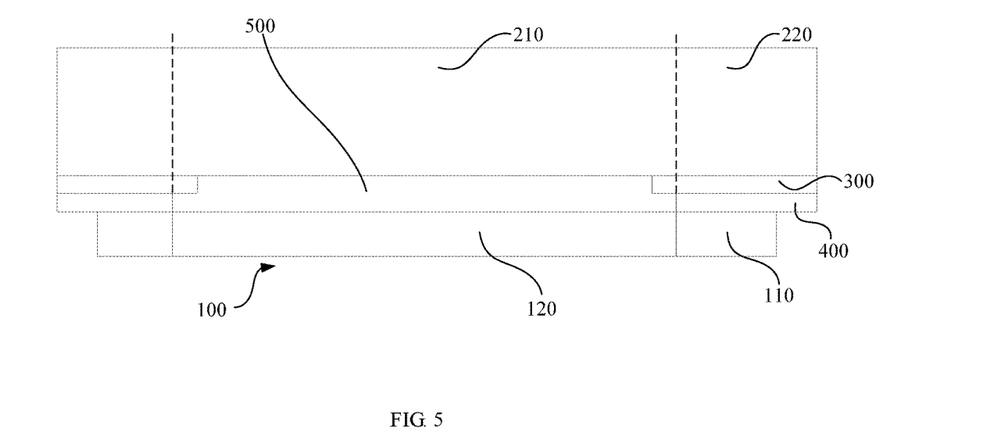
FIG. 5 is a schematic structural view of a screen assembly according to yet another embodiment of the present disclosure.
Figure 6:
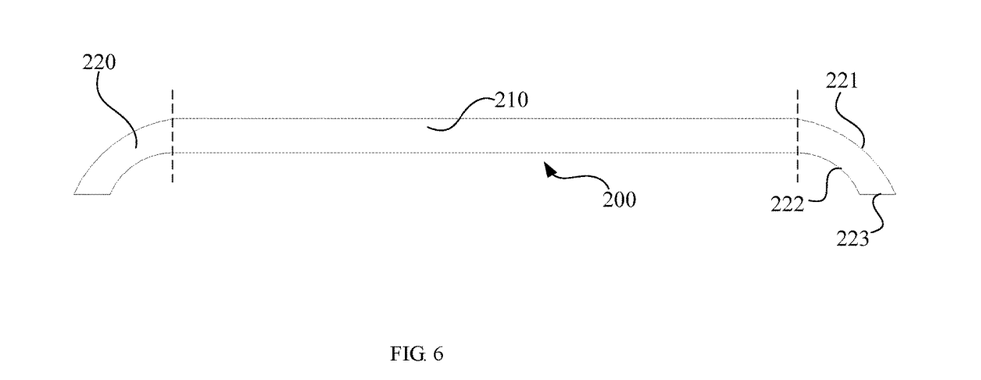
FIG. 6 illustrates an optional configuration of the cover plate shown in FIG. 1.

Referring to FIG. 5, in some embodiments, the overall shape of the cover plate 200 may be flat. In other embodiments, referring to FIG. 6, the transparent portion 210 may be flat while the bezel portion 220 may have a curved shape. The bezel portion 220 may have a first curved surface 221, a second curved surface 222 and a first flat surface 223. The first curved surface 221 may be tangent to the outer surface (upper surface) of the transparent portion 210. The second curved surface 222 may be tangent to the inner surface (lower surface) of the transparent portion 210. Apparently, the curvatures of the first curved surface 221 and the second curved surface 222 may be equal. One end of the first flat surface 223 may be connected with the first curved surface 221, and the other end of the first flat surface 223 may be connected with the second curved surface 222. The first flat surface 223 may be substantially parallel to the inner surface or the upper surface of the transparent portion 210, or, there may exist an angle between the first flat surface 223 and the inner surface or the upper surface of the transparent portion 210. The masking layer 300 may be attached on the second curved surface 222. The masking layer 300 may also extend to the first flat surface 223, and be attached onto the first flat surface 223.

Figure 7:
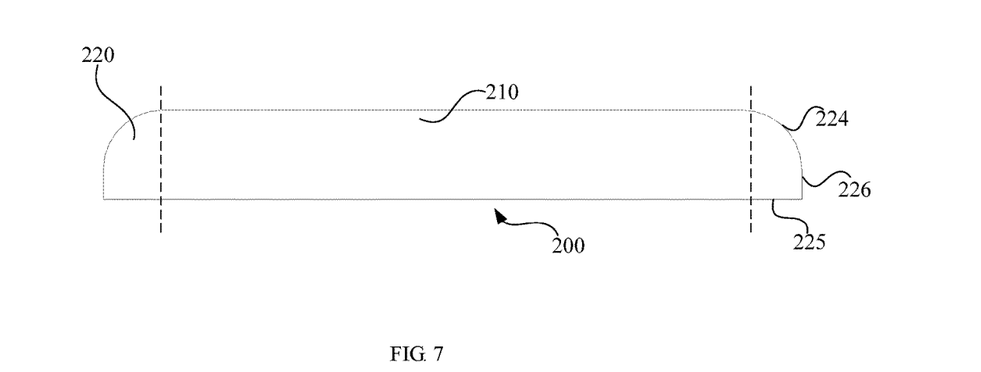
FIG. 7 illustrates another optional configuration of the cover plate shown in FIG. 1.
Figure 8:
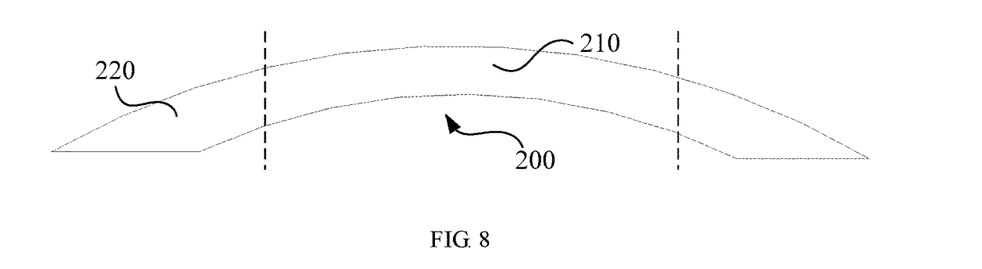
FIG. 8 illustrates yet another optional configuration of the cover plate shown in FIG. 1.
Figure 9:
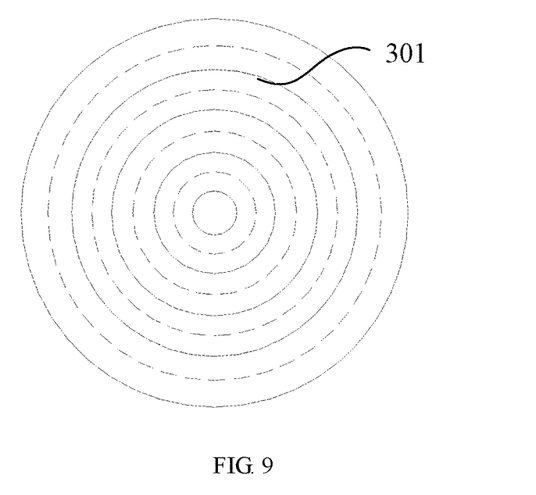
FIG. 9 illustrates an optional pattern of the masking layer shown in FIG. 2.
Figure 10:
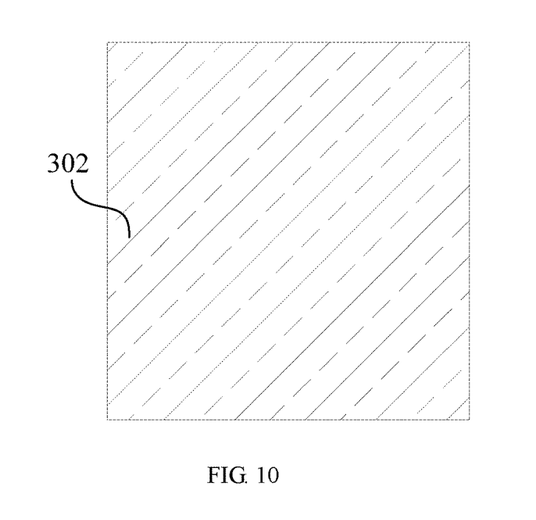
FIG. 10 illustrates another optional pattern of the masking layer shown in FIG. 2.
Figure 11:
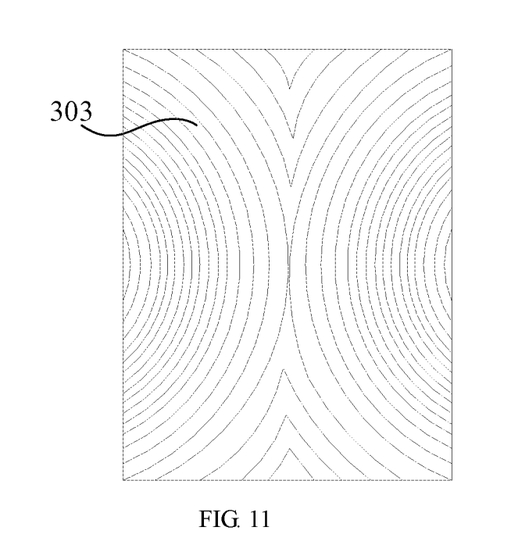
FIG. 11 illustrates another optional pattern of the masking layer shown in FIG. 2.
Figure 12:
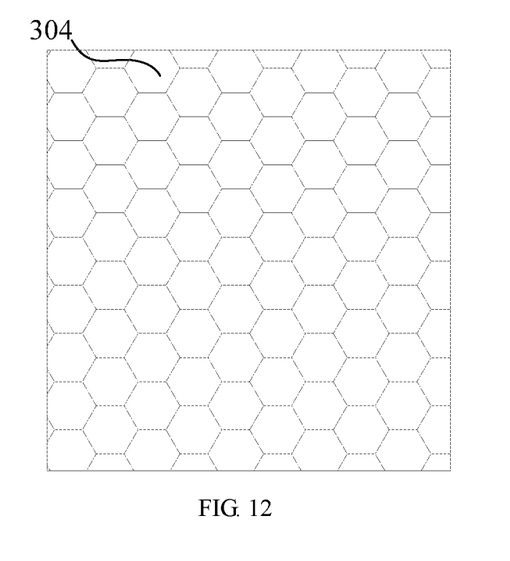
FIG. 12 illustrates another optional pattern of the masking layer shown in FIG. 2.

In some embodiments, referring to FIG. 7, the shape of the transparent portion 210 may be flat while the shape of the bezel portion 220 may be curved. The bezel portion 220 may have a third curved surface 224, a second flat surface 225 and a third flat surface 226. The third curved surface 224 may be tangent to the outer surface of the transparent portion 210. The second flat surface 225 may be connected with the inner surface of the transparent portion 210. The second flat surface 225 may be in a same plane as the inner surface of the transparent portion. An end (the upper end) of the third flat surface 226 may be tangent to the third curved surface 225. The other end (the lower end) of the third flat surface 226 may be substantially perpendicular to the second flat surface 225. The masking layer 300 may be attached on the second flat surface 225. In some embodiments, referring to FIG. 8, both the bezel portion 220 and the transparent portion 210 may have a curved configuration.

In some embodiments, the thickness of the masking layer 300 may range from 20 μm to 24 μm. For example, the thickness of the masking layer 300 may be 20 μm, 23 μm or 24 μm. In this situation, the non-display portion 110 may be effectively sheltered by the masking layer 300. The thickness of the light-shielding layer may range from 8 μm to 10 μm. For example, the thickness of the light-shielding layer 400 may be 8 μm, 9 μm or 10 μm.

The outer edges of the masking layer 300, the light-shielding layer 400 and the cover plate 200 may be substantially aligned, which may facilitate the assembling of the whole screen assembly 10.

Referring to FIGS. 2 to 4, in some embodiments, the masking layer 300 may include a first white ink film 310, a second white ink film 320 and a third white ink film 330. The first white ink film 310, the second white ink film 320 and the third white ink film 330 may all be substantially annular. The outer edges of these films may be substantially level with the outer edge of the bezel portion 220. The first white ink film 310 may be attached on a surface of the bezel portion 220 close to the screen 100 (i.e., the inner surface of the bezel portion). The first white ink film 310 may just cover the whole inner surface of the bezel portion 220 such that the bezel portion 220 may present white color, and may prevent light 103 emitted by the screen 100 from penetrating. The second white ink film 320 may be attached to the lower surface of the first white ink film 310. The third white ink film 330 may be attached to the lower surface of the second white ink film 320. Apparently, the masking layer 300 may include one, two, or more than four layer(s) of white ink films.

The width of the first white ink film 310 may be larger than the width of the second whit ink film 320, and the width of the second white ink film 320 may be larger than the width of the third white ink film 330. The width of an ink film may refer to the distance between the outer edge and the inner edge of the ink film. The second white ink film 320 may only cover a portion of the lower surface of the first white ink film 310. Similarly, the third white ink film 330 may only cover a portion of the lower surface of the second white ink film 320. Given that the outer edges of the first white ink film 310, the second white ink film 320 and the third white ink film 330 are substantially aligned with the outer edge of the bezel portion 220, it can be known that the inner edges of the first, second and third ink films 310~330 are not aligned, which presents a step configuration. The distance between the inner edge of the first white ink film 310 and the inner edge of the second white ink film 320 may be from 0.1 mm to 0.15 mm. Similarly, the distance between the inner edge of the second white ink film 320 and the inner edge of the third white ink film 330 may be from 0.1 mm to 0.15 mm. In this circumstance, normal processing error may be tolerable. A lower white ink film will not extend beyond the inner edge of an upper white ink film towards the transparent portion 210, such that the width of the lower white ink film will not be larger than the width of the upper white ink film.

In some embodiments, the light-shielding layer 400 may be attached to the lower surface of the third white ink film 330. The light-shielding layer 400 may be a black ink film 410. When the cover plate 200 and the screen 100 are attached together by the OCA layer 500, the black ink film 410 may be stacked on the non-display portion 110. The black ink film 410 may have good light absorption capacity. The outer edges of the black ink film 410, the first white ink film 310, the second white ink film and the third white ink film 330 may be substantially aligned. The width of the black ink film 410 may be substantially equal to that of the second white ink film 320. That is, the inner edge of the first white ink film 310 may extend beyond the inner edge of the black ink film 410 towards the transparent portion 210. The distance between the inner edges of the first white ink film 310 and the black ink film 410 may be from 0.1 mm to 0.15 mm. Since the width of the black ink film 410 is no larger than the width of the first white ink film 310, the projection of the first white ink film 310 on the screen 100 may completely cover the projection of the black ink on the screen such that the black edge will not be noticed by the user.

Referring to FIG. 4, in some embodiments, the vertical projection of the screen on the cover plate 200 may have two opposite third projection ends 102. The third projection ends 102 may be the projection of the one pair of outer edges of the screen 100 on the cover plate 200. The distance between each of the two third projection ends 102 and the edge of the cover plate 200 is identical. That is, when the cover plate 200 and the screen 100 are attached, they are also aligned (i.e., the vertical projection of the axis of symmetry of the cover plate 200 on the screen 100 and the axis of symmetry of the screen 100 are overlapped). The width of the screen 100 may be less than the width of the cover plate 200, and the outer edges of the screen 100 may not be flush with the outer edges of the cover plate 200. The distance between the third projection end 102 and the edge of the cover plate 200 may be equal to B, i.e., B refers to the distance between the edge of the screen 100 and the edge of the cover plate 200. The range of B may be from 0.2 mm to 0.8 mm. For example, B may be 0.2 mm, 0.3 mm, 0.4 mm or 0.8 mm. When the cover plate 200 and the screen 100 are attached together and aligned, the gap between the edges of the screen 100 and the cover plate 200 may be used as a space for filling glue. Thus, the screen assembly 10 may be attached with other components (e.g., the back case or the middle frame.

In some embodiments, the screen assembly 10 may include a screen 100, a cover plate 200, a masking layer 300 and a light-shielding layer 400. The screen 100 may include a display portion 120 and a non-display portion 110. The display portion 120 may emit light. The non-display portion 110 may be connected to the fringe of the display portion 120, and the non-display portion 110 cannot emit light. The cover plate 200 and the screen 100 may be stacked together. The masking layer 300 may be attached on a surface of the cover plate 200 which is close to the screen 100. The vertical projection of the masking layer 300 on the screen 100 may cover the whole non-display portion 110. A portion of the screen 100 on which the masking layer 300 is attached may be a bezel portion (where light cannot pass). The other portion of the screen 100 which is not attached to the masking layer 300 may be a transparent portion (where light can pass). The light-shielding layer 400 may be attached on the masking layer 300 and stacked on the non-display portion 110. The vertical projection of the masking layer 300 on the screen 100 may cover the vertical portion of the whole light-shielding portion 400 on the screen 100. In this circumstance, the masking layer 300 may cover the non-display portion 110 such that light leaking at the non-display portion may be prevented.

Referring to FIGS. 1 and 2, the present disclosure further provides a mobile terminal 20. The mobile terminal 20 may include the screen assembly 10 of any embodiment described-above. The mobile terminal may be, for example, a smart phone.

Referring to FIGS. 2 to 5 and FIG. 13, the present disclosure further provides a method for manufacturing a screen assembly. The method may mainly include operations described in the following blocks.

Figure 13:
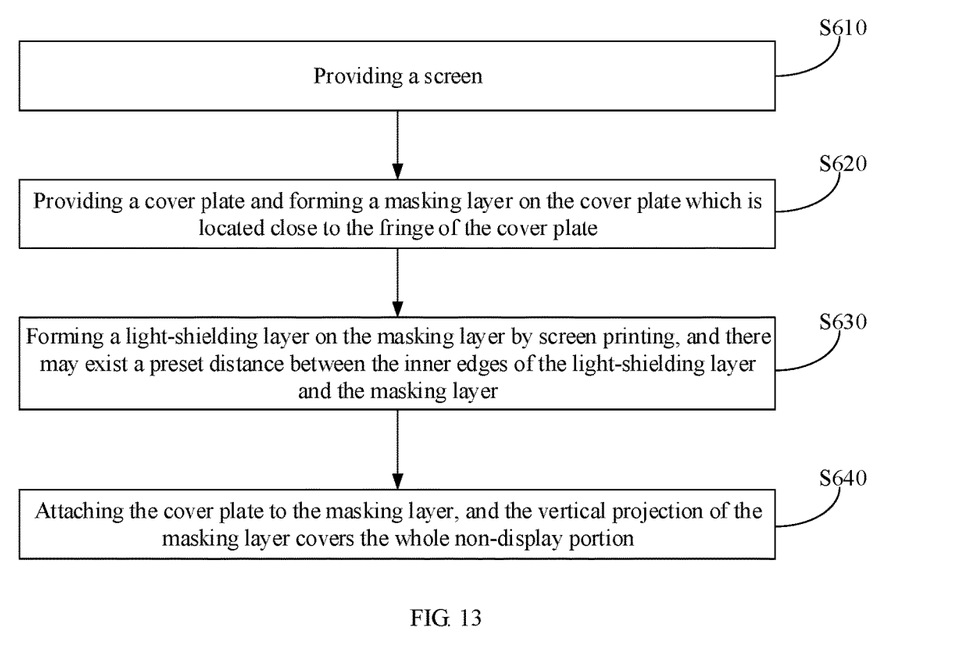
FIG. 13 is a flow chart of a method for manufacturing a screen assembly according to an embodiment of the present disclosure.

S610: Providing a screen 100. The screen 100 may include a display portion 120 and a non-display portion 110. The display portion 120 may emit light. The non-display portion 110 may connect to the fringe of the display portion 120, and the non-display portion 110 cannot emit light.

S620: Providing a cover plate 200 and forming a masking layer 300 on the cover plate by screen printing. The cover plate 200 may be made of transparent class. The masking layer 300 may be close to the fringe of the cover plate. The outer edge of the masking layer 300 may be substantially aligned with the outer edge of the cover plate 200.

S630: Forming a light-shielding layer 400 having an annular configuration on the masking layer 300 by screen printing. The outer edge of the light-shielding layer 400 may be substantially aligned with the outer edge of the masking layer 300. There may exist a preset distance between the inner edge of the light-shielding layer 400 and the masking layer 300. Thus, the error during screen printing process may be limited, and the width of the light-shielding layer 400 may be ensured to be less than the width of the masking layer 300.

S640: Attaching the cover plate 200 with the masking layer 300 and the light-shielding layer 400 onto the screen 100. The cover plate 200 and the screen 100 may be stacked together by optically clear adhesive (OCA). Accordingly, the light-shielding layer 400 may be stacked on the screen 100. The vertical projection of the masking layer 300 on the screen 100 may cover the whole non-display portion 110. The vertical projection of the masking layer 300 on the screen 100 may also cover the vertical projection of the whole light-shielding layer 400 on the screen 100. Since the masking layer 300 may shelter the non-display portion 110, light leaking at the non-display portion 110 may be prevented.

In some embodiments, during the process of forming the masking layer 300 or the light-shielding layer 400 by screen printing, antifoaming agent may be added into the masking layer or the light-shielding layer, where a weight ratio of the antifoaming agent to the masking layer or the light-shielding layer may be from 0.2% to 0.4%. The antifoaming agent may include defoaming polymer or organosilane fluoroalkanes mixture. Bubbles may occur during the screen printing process of the masking layer 300 or the light-shielding layer 400 due to various factors such as the viscosity of the masking layer 300 or the light-shielding layer 400, the temperature of screen printing and the movement speed of printing scraper, which may cause the surface of the masking layer 300 or the light-shielding layer 400 to be uneven and bumpy and thus influencing the screen printing quality. The antifoaming agent may effectively eliminate the bubbles during the screen printing process such that the flatness of the masking layer 300 or the light-shielding layer 400 formed by screen printing may be improved.

During the screen printing process of the masking layer 300 or the light-shielding layer 400. Based on actual requirement, the hardness of the screen printing scraper may range from 50 A to 60 A (Shore hardness), the movement speed of the screen printing scraper may range from 2 m/min to 3 m/min, and the pressure of the screen printing scraper against the print screen may range from 1 MPa to 1.5 MPa, which may make the thickness of the masking layer 300 or the light-shielding layer 400 more even, reduce friction, extend the service life of the printing screen, and ensure the printing quality of the masking layer 300 or the light-shielding layer 400. After the screen printing process, the masking layer 300 or the light-shielding layer 400 may be heated and cured. The curing temperature may range from 230-240° C., and the curing period may range from 15-20 min.

To increase the bonding force between the light-shielding layer 400 and the masking layer 300, the mesh number for screen printing the masking layer 300 may be less than the mesh number for screen printing the light-shielding layer 400. Moreover, to increase the bonding force between the masking layer 300 and the cover plate 200, the following operations may be executed before forming the masking layer 300 by screen printing. Firstly, the cover plate 200 may be polished by polishing solution. Then, oil and other contamination on the surface of the cover plate 200 may be removed by pickling and alkaline cleaning. At last, the cover plate 200 may be put in the cleaning solution (e.g., water based detergent), and be further cleaned by ultrasonic cleaning process, where the cleaning period may be controlled to be within 20 min to 25 min.

It should be noted that the terminal used herein (also referred to as a communication terminal) includes, but is not limited to, a device configured to be connected via a wired connection (such as a public switched telephone network (PSTN), a digital subscriber line (DSL), a digital cable, a direct cable connection, and/or another data connection/ network) and/or receive/transmit a communication signal via a wireless interface (e.g., for a cellular network, a wireless local area network (WLAN), a digital television network such as a DVB-H network, a satellite network, an AM-FM broadcast transmitter, and/or another communication terminal). A communication terminal configured to communicate via the wireless interface can be referred to as "a wireless communication terminal," "a wireless terminal" and/or "a mobile terminal." Examples of the mobile terminal include but are not limited to a satellite or cellular telephone; a personal communication system (PCS) terminal capable of combining cellular radiotelephone with data processing, facsimile and data communication capabilities; a PDA integrated with a radiotelephone, a pager, an Internet/Intranet access, a Web browser, a notebook, a calendar, and/or a global positioning system (GPS) receiver, and conventional laptop and/or palmtop receivers or other electronic devices including radiotelephone transceivers.

The technical features of the above-described embodiments can be arbitrarily combined. In order to make the description brief, not all possible combinations of the respective technical features in the above-described embodiments are described. As long as there is no contradiction in the combination of these technical features, it should be considered within the scope of present disclosure.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure. Therefore, the scope of the present disclosure should be subject to the appended claims.

What is claimed is:

1. A screen assembly, comprising:
   a screen comprising a display portion and a non-display portion surrounding the display portion, wherein the display portion is capable of emitting light, and the non-display portion does not emit light;
   a cover plate stacked on the screen and comprising a transparent portion corresponding to a location of the display portion and a bezel portion surrounding the transparent portion, wherein a vertical projection of the bezel portion on the screen covers the whole non-display portion;
   a masking layer attached on a side of the bezel portion close to the screen and covering the whole bezel portion; and
   a light-shielding layer attached on a side of the masking layer close to the screen and stacked on the non-display portion and directly sandwiched between the screen and the masking layer;
   wherein a vertical projection of the masking layer on the screen covers a vertical projection of the whole light-shielding layer on the screen.

2. The screen assembly of claim 1, wherein
   an inner edge of the masking layer is closer to a center of the screen than an inner edge of the light-shielding layer; and
   a distance between the inner edge of the masking layer and the inner edge of the light-shielding layer is from 0.01 mm to 0.15 mm.

3. The screen assembly of claim 2, wherein
   the inner edge of the masking layer is flush with a connection position between the display portion and the non-display portion in an extending direction of the screen; or
   the inner edge of the light-shielding layer is flush with a connection position between the display portion and the non-display portion in an extending direction of the screen; or
   a connection position between the display portion and the non-display portion is located between the inner edge of the masking layer and the inner edge of the light-shielding layer.

4. The screen assembly of claim 1, wherein
   light transmittance of the masking layer is less than 1%.

5. The screen assembly of claim 1, wherein
   a thickness of the masking layer ranges from 20 µm to 24 µm; or
   a thickness of the light-shielding layer ranges from 8 µm to 10 µm.

6. The screen assembly of claim 1, wherein
   an outer edge of the masking layer, an outer edge of the light-shielding layer and an outer edge of the cover plate are substantially aligned.

7. The screen assembly of claim 1, wherein
   the masking layer comprises a first white ink film attached on and covering the whole of the bezel portion, a second white ink film attached on the first white ink film, and a third white ink film attached on the second white ink film.

8. The screen assembly of claim 7, wherein
   a width of the first white ink film is larger than a width of the second white ink film, and the width of the second white ink film is larger than a width of the third white ink film.

9. The screen assembly of claim 7, wherein
   the light-shielding layer is attached on the third white ink film, and a width of the light-shielding layer is substantially equal to a width of the second white ink film.

10. The screen assembly of claim 1, wherein
    the light-shielding layer is a black ink film.

11. The screen assembly of claim 1, wherein
    a distance between each of two opposite outer edges of the screen and a respective outer edge of the cover plate is identical.

12. The screen assembly of claim 11, wherein
    the distance between each of the two opposite outer edges of the screen and the respective outer edge of the cover plate ranges from 0.2 mm to 0.8 mm.

13. A method for manufacturing a screen assembly, comprising:
    providing a screen, wherein the screen comprises a display portion and a non-display portion surrounding the display portion, the display portion is capable of emitting light, and the non-display portion does not emit light;
    providing a cover plate and forming a masking layer on the cover plate by screen printing, wherein the masking layer has an annular configuration;
    forming a light-shielding layer on the masking layer by screen printing, wherein a preset distance exists between an inner edge of the light-shielding layer and an inner edge of the masking layer; and
    attaching the cover plate with the masking layer and the light-shielding layer on the screen such that the light-shielding layer is stacked on the screen, wherein a vertical projection of the masking layer on the screen covers the whole non-display portion, and the vertical projection of the masking layer on the screen covers a vertical projection of the whole light-shielding layer on the screen;

wherein a printing mesh for forming the masking layer has a smaller mesh number than a printing mesh for forming the light-shielding layer.

14. The method of claim 13, further comprising:

during the forming the masking layer by screen printing or forming the light-shielding layer by screen printing, adding antifoaming agent into the masking layer or the light-shielding layer, wherein a weight ratio of the antifoaming agent to the masking layer or the light-shielding layer is from 0.2% to 0.4%.

15. A mobile terminal with a screen assembly, the screen assembly comprising:

a screen comprising a display portion and a non-display portion surrounding the display portion, wherein the display portion is capable of emitting light, and the non-display portion does not emit light;

a cover plate stacked on the screen;

a masking layer attached on a side of the cover plate close to the screen and covering; and a light-shielding layer attached on a side of the masking layer close to the screen and stacked on the non-display portion;

wherein a vertical projection of the masking layer on the screen covers a vertical projection of the whole light-shielding layer on the screen and covers the whole non-display portion;

an inner edge of the masking layer is closer to a center of the screen than an inner edge of the light-shielding layer; and a distance between the inner edge of the masking layer and the inner edge of the light-shielding layer is from 0.01 mm to 0.15 mm.

16. The mobile terminal of claim 15, wherein the inner edge of the masking layer is flush with a connection position between the display portion and the non-display portion in an extending direction of the screen; or the inner edge of the light-shielding layer is flush with a connection position between the display portion and the non-display portion in an extending direction of the screen; or a connection position between the display portion and the non-display portion is located between the inner edge of the masking layer and the inner edge of the light-shielding layer.

17. The mobile terminal of claim 15, wherein an outer edge of the masking layer, an outer edge of the light-shielding layer and an outer edge of the cover plate are substantially aligned.

18. The mobile terminal of claim 15, wherein a distance between each of two opposite outer edges of the screen and a respective outer edge of the cover plate is identical.

* * * * *